March 9, 1965  E. D. GRIM, JR  3,173,018
FIBER OPTIC LOAD POSITIONER
Filed Nov. 9, 1961  3 Sheets-Sheet 1
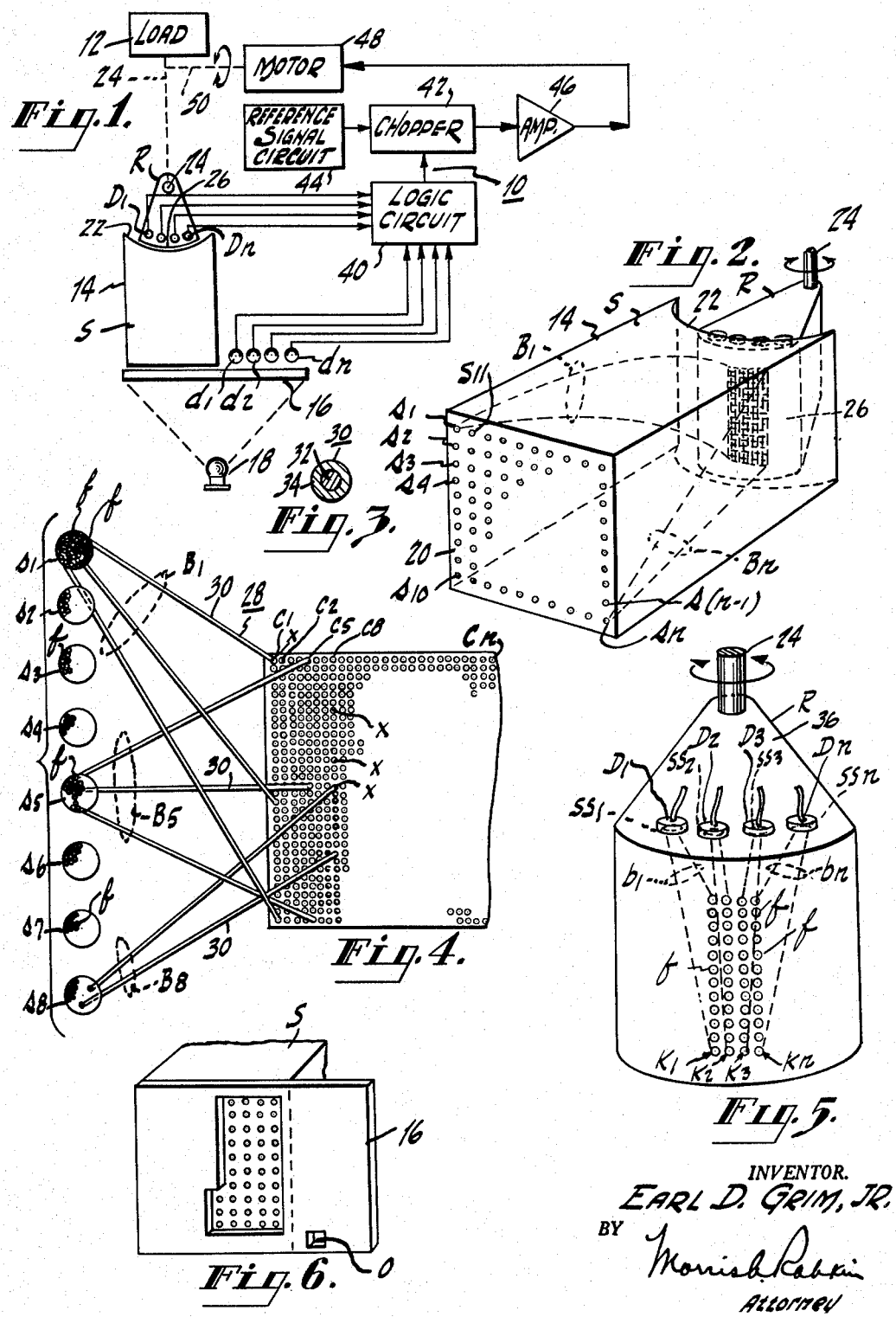
INVENTOR.
EARL D. GRIM, JR.
BY
Attorney March 9, 1965  E. D. GRIM, JR  3,173,018
FIBER OPTIC LOAD POSITIONER
Filed Nov. 9, 1961  3 Sheets-Sheet 2

INVENTOR.
EARL D. GRIM, JR.
BY
Attorney

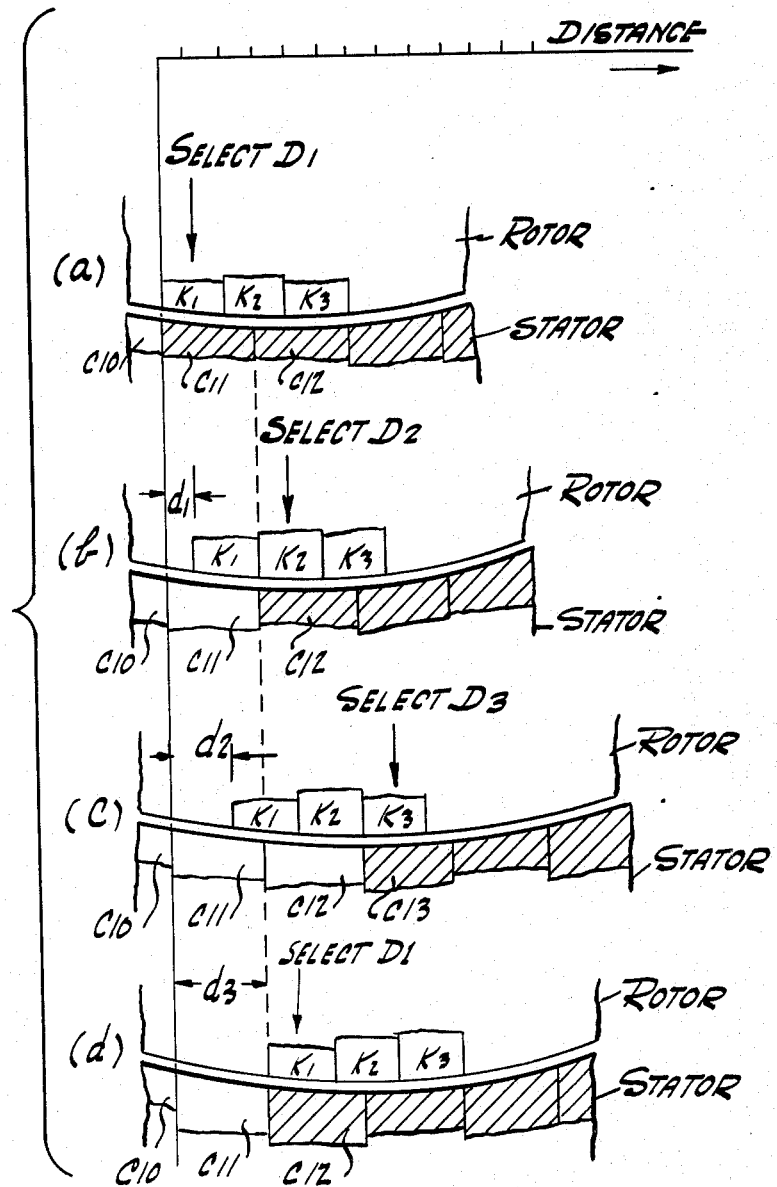

United States Patent Office 3,173,018
Patented Mar. 9, 1965

3,173,018
FIBER OPTIC LOAD POSITIONER
Earl D. Grim, Jr., Merchantville, N.J., assignor to Radio Corporation of America, a corporation of Delaware
Filed Nov. 9, 1961, Ser. No. 151,346
9 Claims. (Cl. 250—227)

This invention relates generally to sensing devices, and more particularly to a fiber optic sensor adapted for use in a servo system to position a load in accordance with a prerecorded input command.

One of the components of a servo positioning system that determines the system's resolution and accuracy is the sensor that senses the voltage or current analog of the load position. It has been proposed to use A.-C. operated sensors, such as synchros, microsyns, and resolvers, as well as D.-C. operated sensors, such as resistive potentiometers, for this purpose. A disadvantage in using the A.-C. type sensors is the unwanted presence of a quadrature voltage at the null point that may saturate a relatively sensitive synchro system. A disadvantage in using the resistive potentiometer as a sensor is the unwanted wear caused by the potentiometer's sliding contact, resulting in a relatively short lifetime of the unit and a degraded servo performance during that lifetime.

It is an object of the present invention to provide an improved sensor that will obviate the aforementioned disadvantages of prior art sensors.

Another object of the present invention is to provide an improved sensor, employing fiber optic elements, for a servo system to position a load accurately with respect to a reference position.

Still another object of the present invention is to provide an improved positioning device employing the vernier principle for positioning a load accurately by means of a servo system.

A further object of the present invention is to provide an improved positioning device that lends itself easily to automatic sequential positioning of a load in accordance with prerecorded input commands.

Still a further object of the present invention is to provide an improved positioning device, employing fiber optic elements, capable of moving a load a distance that is a fraction of the diameter of a fiber optic element.

Briefly, the improved sensor, or positioning device, of the present invention is adapted for use in a closed loop, position-controlled servo system to provide automatic sequential positioning of a workpiece. The sensor comprises a stationary part, such as a stator, and a movable part, such as a rotor. The stator has associated with it a matrix array of fiber optic elements to transform input intelligence, in the form of light passing through an apertured record, into a precise array of light and dark areas along the path on which positioning of the rotor is desired. Another array of fiber optic elements is associated with the rotor in a manner to produce an error signal if it is not at a desired position with respect to the fiber optic array associated with the stator. The rotor is coupled to the load, and the error signal causes the servo system to move the load to the position determined by the input command by moving the rotor until the error signal is reduced to zero. A positioning accuracy of a fractional part of the diameter of a fiber optic element can be obtained by using fiber optic elements of different diameters in the fiber optic arrays in the stator and in the rotor, respectively, to provide a vernier effect.

The novel features of the present invention, both as to its organization and mode of operation, as well as additional objects and advantages thereof, will be more readily understood from the following description, when read in connection with the accompanying drawings, in which similar reference characters refer to similar parts throughout, and in which:

FIG. 1 is a schematic diagram, partly in block diagram form, of a servo positioning system employing an improved positioning device of the present invention;

FIG. 2 is a perspective view of an improved positioning device of the present invention, as viewed from the front, side, and top of the positioning device;

FIG. 3 is a cross-sectional view of a single fiber optic element used in the improved positioning device of the present invention;

FIG. 4 is a fragmentary view of the fiber optic system of the stator of the positioning device shown in FIG. 2;

FIG. 5 is a perspective view of the rotor of the positioning device illustrated in FIG. 2, showing the front and top of the rotor;

FIG. 6 is a perspective view of an apertured record positioned on the matrix array associated with the stator of the positioning device shown in FIG. 2;

Figure 9:
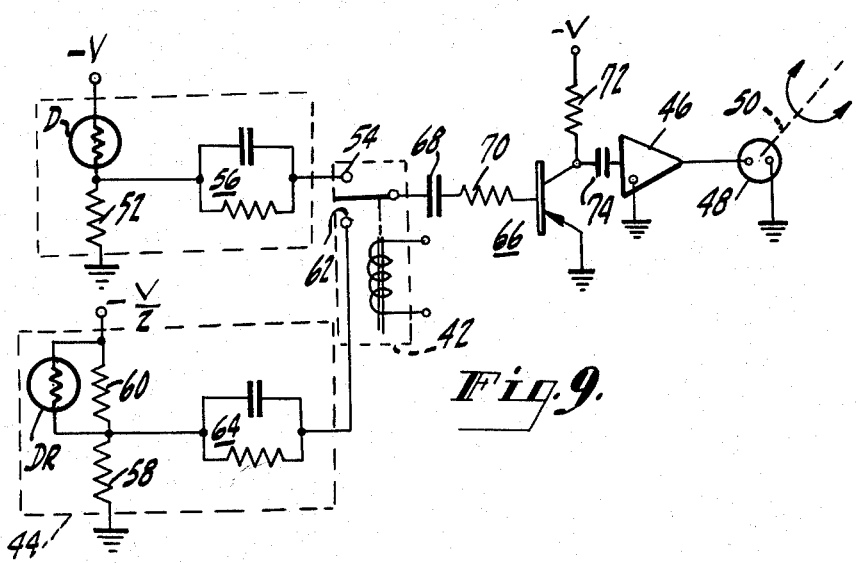

FIGS. 8(a), (b), (c), and (d) are fragmentary plan views of the rotor and stator, with parts broken away to show the fiber optic elements, in different alignments to illustrate the operation of the positioning device of the present invention; and FIG. 9 is a schematic diagram of a servo system for use with the positioning device of the present invention.

Referring, now, to FIG. 1, there is shown a closed-loop servo positioning system 10 for positioning a load 12 by means of a positioning device 14 in accordance with information on an apertured record 16. The information on the record 16 may be in the form of apertures, as shown in FIG. 6, to permit light from a light source 18 to pass through selected apertures and to provide a command for operating the servo system 10. The servo system 10 comprises all of the components illustrated in FIG. 1.

The positioning device 14, the sensor of the servo system 10, comprises a stationary part, such as a stator S, and a movable part, such as a rotor R, parts of which are shown in detail in FIGS. 2, 3, 4, and 5. The stator S comprises a block of material having a planar front wall 20 and an arcuately-curved rear wall 22. The rotor R is fixed to a shaft 24 for rotation therewith. The front wall 26 of the rotor R is disposed substantially parallel to and adjacent to the rear wall 22 of the stator S and describes an arc when the rotor R moves about the axis of the shaft 24. The load 12 is fixed to the shaft 24 so that it moves with motion of the rotor R.

A fiber optic system 28 (FIG. 4) is disposed within the stator S to receive and display information from the record 16. The fiber optic system 28 comprises a plurality of bundles B1 . . . B$n$ of fiber optic elements 30. Each element 30 (FIG. 3) consists of a rod-like core 32 of glass of a relatively high index of refraction surrounded by a sheath 34 of glass of a relatively lower index of refraction, as shown in FIG. 3. Thus, light impinging upon the entrance face $f$ of an element 30 is reflected internally until it emerges at the exit face $x$ of the element 30. The element 30 acts as a "waveguide" for the light applied to it.

The entrance faces $f$ of each bundle of elements 30 are aligned in the surface of the front wall 20 to form a separate spot $s$ therein. Thus, the entrance faces $f$ of the bundles B1 . . . B$n$ form spots $s1$ . . . $sn$, respectively, in the surface of the front wall 20 of the stator S. The spots $s1$ . . . $sn$ may be arranged, for example, in a regular spot matrix array of ten rows and ten columns, as shown in FIG. 2. It will be understood, however, that other matrix arrays of the spots $s1 \ldots sn$ may be used.

The exit faces $x$ of each bundle of the elements 30 are aligned to form a separate column C in the surface of the arcuate, rear wall 22 of the stator S. Thus, the exit faces $x$ of the bundles $B1 \ldots Bn$ form columns $C1 \ldots Cn$, respectively, in the rear wall 22 of the stator S. The columns $C1 \ldots Cn$ are adjacent to and parallel to each other, forming a column array. Light received by the entrance faces $f$ of a spot $s$ of a bundle B will be displayed on the exit faces $x$ of the column C of that bundle B. The apertured record 16 may be cut so as to block light to selected spots, such as $s1 \ldots sh$ and to admit light to selected spots, such as $s(h+1) \ldots sn$. In the latter case, columns $C1 \ldots Ch$ will be dark, forming a dark area of the column array, and columns $C(h+1) \ldots Cn$ will display light, forming a light area of the column array.

Referring, now, to FIG. 5, there is shown another system of fiber optic elements 30 associated with the rotor R. This system comprises a plurality of bundles $b$ of fiber optic elements 30. The entrance faces $f$ of the bundles $b1 \ldots bn$ are aligned in an array of parallel and adjacent columns $K1 \ldots Kn$, respectively, in the surface of the front wall 26 of the rotor R. The exit faces of the bundles $b1 \ldots bn$ are arranged in spots $ss1 \ldots ssn$, respectively, in one of the walls, such as the top wall 36, of the rotor R. It will now be understood that light received by the entrance faces $f$ of one or more of the columns $K1 \ldots Kn$ will be displayed by one or more of the respective spots $ss1 \ldots ssn$.

Photosensitive devices such as photo-diodes $D1 \ldots Dn$ are disposed over spots $ss1 \ldots ssn$, respectively, to provide signals when these spots display light. The array of parallel columns $K1 \ldots Kn$ is disposed on the rotor R so that it can be moved parallel to and adjacent to the array of parallel columns $C1 \ldots Cn$ on the stator S.

The operation of the improved positioning device 14 will be explained in accordance with its function as a sensor in the servo system 10, illustrated in FIG. 1 and FIG. 9. Photo-diodes $D1 \ldots Dn$ are connected, respectively, to one set of inputs of a logic circuit 40. A plurality of photo-sensitive devices $d1 \ldots dn$ are respectively connected to another set of inputs of the logic circuit 40. The logic circuit 40 may comprise, for example, a decoding matrix which is actuated by the combination of light and dark inputs from the plurality of diodes $d1 \ldots dn$, in a manner known in the computer art. The output from the diodes or photosensors $d1 \ldots dn$ may actuate a relay or diode switch (not shown) to select the desired diode output of the plurality of diodes $D1 \ldots Dn$ on the rotor. The selected diode output signal from the logic circuit 40 is applied to a comparator 42, such as a chopper, to compare a reference signal from a reference signal circuit 44 with the output signal of the logic circuit 40 to obtain an error signal. The output of the comparator 42, that is, the error signal, is applied to the input of a linear power amplifier 46 whose output, in turn, is connected to a two-phase, reversible servo motor 48. The output shaft 50 of the motor 48 is coupled mechanically to the shaft 24 of the rotor R to rotate the latter, whereby to move the load 12 in one direction or another, depending upon the phase of the error signal.

Referring, now, to FIG. 9, a photo-diode D has one terminal connected to a source of voltage $-V$ and another terminal connected to a common connection, such as ground, through a resistor 52. The photo-diode D in FIG. 9 represents one of the photo-diodes $D1 \ldots Dn$ that may be selected by the logic circuit 40 in accordance with information on the apertured record 16. The common connection between the diode D and the resistor 52 is connected to one input terminal 54 of the comparator circuit 42 through a servo compensating network 56. A photo-diode DR that generates the reference signal has one end connected to a source of voltage $V/2$ and another terminal connected to ground through a resistor 58. The common junction between the resistor 58 and diode DR is connected to another input terminal 62 of the comparator circuit 42 through a compensating network 64. The photo-diode DR receives a partial illumination to form a current reference, and it is used in the reference signal circuit to compensate for temperature changes that may affect the photo-diodes D.

The output of the comparator circuit 42 is capacitively coupled to the input of the amplifier 46 through a transistor 66. The output of the comparator circuit 42 is connected to the base of the transistor 66 through a capacitor 68 in series with a resistor 70. The collector of the transistor 66 is connected to a source of voltage $-V$ through a resistor 72, and also to the input of the amplifier 46 through a capacitor 74. The emitter of the transistor 66 is connected to ground.

The comparator circuit 42 compares signals from the photo-diode D with a reference signal from the reference signal circuit 44. The output of the comparator circuit 42 is applied to the motor 48 through the amplifier 46 to rotate the motor 48 one way or the other, depending upon the amplitude of the signal at the terminal 54 with respect to the amplitude of the reference signal at the terminal 62 of the comparator circuit 42.

The operation of the servo system 10 of FIG. 1, using the novel positioning device 14 of the present invention as the sensor of the servo system 10, will now be explained. Let it be assumed that the diameter of each of the fiber optic elements 30 in the stator S is 0.003 inch, and the diameter of each of the fiber optic elements 30 in the rotor R is 0.002 inch. The diameter of the elements 30 in the rotor R and the diameter of the elements 30 in the stator S should be different from each other in a manner to obtain positioning by the vernier principle. The apertured record 16 permits light from the light source 18 to illuminate only certain spots $s$ and to produce a precise light-to-dark transition in the column array in the stator S. If, for example, the light-to-dark transition is desired between columns C3 and C4, then the record 16 will be apertured to permit only spots $s1$, $s2$, and $s3$ to be illuminated, and the rest of the spots of the matrix will be covered, that is, kept dark.

The servo system 10 is initially set up so that an error signal will drive the load shaft 24 until a predetermined column K in the column array on the rotor R is moved to the light-to-dark transition in the column array on the stator S. The aforementioned column K is one of the columns $K1 \ldots Kn$ on the rotor R and is selected by the logic circuit 40 when an aperture in the record 16 transmits light to a selected photosensitive device $d$ of the diodes $d1 \ldots dn$. The aperture O in the record 16 is for the latter purpose.

The mode of operation of the positioning device 14 for rotating the rotor R in increments of 0.001 inch will now be explained. Let it be assumed that, initially, the left edge of the column K1 of the rotor R is aligned with the left edge of the column C11, as shown in FIG. 8($a$). The left edge of the column K1 is now at the light-to-dark transition between columns C10 and C11. To move the rotor R 0.001 inch to the right with respect to the stator S, an apertured record 16 is applied to the spot matrix array on the stator S so that a new light-to-dark transition is caused to occur between columns 11 and 12, as shown in FIG. 8($b$). The aperture O in the record 16 is disposed to cause the photosensitive device $d2$ to produce a signal which, in turn, causes the logic circuit 40 to select the diode D2 and column K2 of the rotor R. The column K2, now being momentarily partly opposite a light area (column 11) when the new record is put in place, causes a strong signal to be generated by the diode D2. This signal causes the motor 48 to move the rotor R to the right until the signal developed by the diode D2 equals the reference signal. At this point, the error signal is zero and the left edge of column K2 is substantially opposite the light-to-dark transition between columns C11 and C12 on the stator S, as shown in FIG. 8(b). The rotor R now comes to a halt after having moved a distance of $d_1$, that is, 0.001 inch.

In order to move the rotor R an additional 0.001 inch, that is, from the position shown in FIG. 8(b) to the position shown in FIG. 8(c), a record 16 is placed on the spot matrix of the stator S to cause a light-to-dark transition between columns C12 and C13, as shown in FIG. 8(c). The aperture O in the record 16 now causes light to select the photosensitive device $d3$ which, in turn, causes the logic circuit to select the photo-diode D3 and column K3. Since, when the new record is put in place, the column K3 is then momentarily partly opposite a light area (column C12), the rotor R is caused to move to the right until the left edge of column K3 is substantially opposite the light-to-dark transition between columns C12 and C13, as shown in FIG. 8(c). In this position, the error signal is zero and the rotor R is caused to stop moving.

In order to move the rotor R an additional increment of 0.001 inch, an apertured record 16 is applied to the spot matrix on the stator S to provide a light-to-dark transition between columns C11 and C12, as shown in FIG. 8(d). An aperture O on the record 16 also causes light to actuate the photo-sensitive device $d1$ which, in turn, selects the column K1 and the diode D1 through the logic circuit 40. Column K1, now being momentarily partly opposite a light area (column C11) when the new record is put in place, causes D1 to generate a strong signal. This latter action causes the motor 48 to rotate the rotor R until the left edge of column K1 is substantially aligned with the light-to-dark transition between columns C11 and C12, as shown in FIG. 8(d).

It will be noted that, even though the diameters of the fiber elements 30 in the columns of the stator and the rotor are 0.003 and 0.002 inch, respectively, it is possible to move the rotor 0.001 inch because of the vernier mode of operation illustrated in FIGS. 8(a), (b), (c), and (d). It will also be understood that the rotor R may be moved more than 0.001 inch at a time, if so desired.

Figure 7:
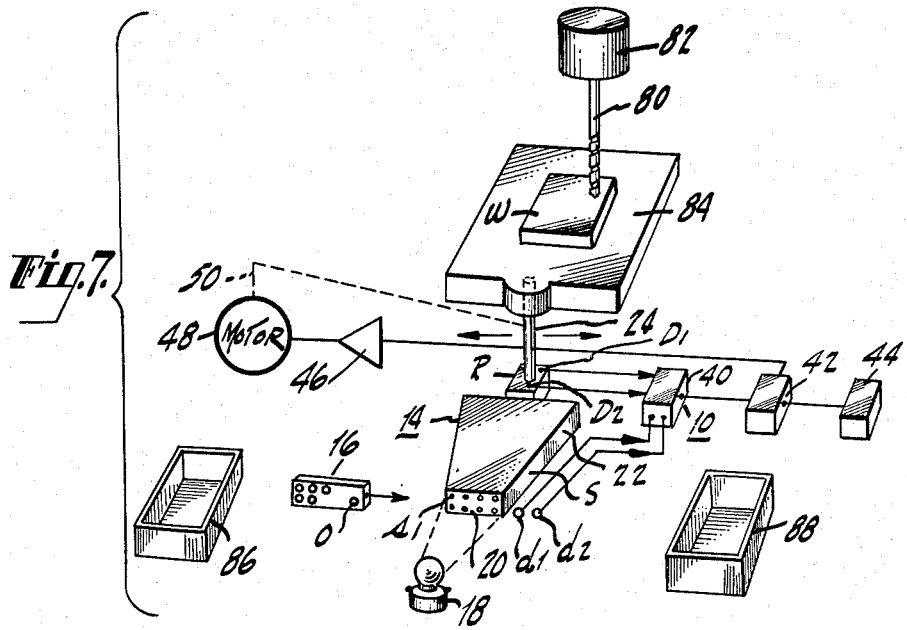
FIG. 7 is a schematic diagram of a servo positioning system employing the improved positioning device of the present invention for positioning a workpiece sequentially in accordance with a program punched on cards.

Referring, now, to FIG. 7, there is shown an application of the positioning device 14 in the servo positioning system 10 for positioning a workpiece W with respect to the bit 80 of a drill 82. The load to be moved by the rotor R is shown as a work table 84. The work table 84 is securely fixed to the shaft 24 for movement with the rotor R. The workpiece W is fastened to the table 84 by any suitable means. A series of apertured records 16 may be punched, that is, programmed, to position the workpiece W sequentially for a number of operations, such as drilling operations, for example. The apertured records 16 may be stored in a box 86 before use. After use, the apertured records 16 are placed in a box 88.

In operation, the first apertured record 16 of a series of records 16 (program) is placed in front of the spot matrix on the front wall 20 of the stator S. The rotor R is then caused to move in the manner described above. Since the workpiece W moves with the rotor R, the workpiece W is moved to a desired location for a drilling operation by the drill 82. When this operation is completed, the first apertured record 16 is put in the box 88, and the next programmed record 16 is placed on the spot matrix on the stator S. This causes the rotor R to move to a second desired position so that the workpiece W may have performed on it a second operation by the drill 82. Thus, a series of operations may be performed on the workpiece W by positioning it sequentially in accordance with instructions on a series of programmed records 16.

From the foregoing description, it will be apparent that there has been provided a novel sensor, employing fiber optics, for positioning a workpiece accurately by means of a servo system. While the sensor has been described as a positioning device comprising a stator and a rotor, it will be understood that the servo motor may move the rotor along any desired path, such as a linear path, for example, in addition to, or in place of, the arcuate path shown and described merely for illustrative purposes. Also, the load may be moved by more than one positioning device where movement is desired in many directions. While the sensor and its associated servo system of the present invention have been shown in diagrammatic form, variations coming within the spirit of this invention will, no doubt, readily suggest themselves to those skilled in the art. Hence, it is desired that the foregoing shall be considered merely as illustrative and not in a limiting sense.

What is claimed is:

1. A positioning device for a system having means to produce relative motion between two parts in accordance with light information transmitted to photo-responsive means through selected bundles of fiber optic elements in said two parts, said device comprising said two parts disposed for relative motion with respect to each other, a plurality of substantially similar bundles of fiber optic elements, each of said elements having an entrance face and an exit face, said entrance faces of said elements in each of said bundles being aligned to form a spot, means disposing said spots in a matrix array, said two parts having adjacent surfaces, said exit faces of said elements in each of said bundles being aligned in a separate column in said surface of one of said parts, said columns of exit faces being adjacent to each other and forming an array in said surface of said one part, at least one bundle of fiber optic elements having portions within the other of said parts, each of said elements of said one bundle having an entrance face and an exit face, said entrance faces of said elements of said one bundle being aligned in a column in said surface of said other part, and said exit faces of said elements of said one bundle being arranged to form a spot.

2. A positioning device for a system having means to produce relative motion between a stator and a rotor in accordance with light information transmitted to photo-responsive means through selected bundles of fiber optic elements in said stator and said rotor, said device comprising said stator and said rotor, a plurality of substantially similar bundles of fiber optic elements, each of said elements having an entrance face and an exit face, said entrance faces of said elements in each of said bundles being aligned to form a spot, means disposing said spots in a matrix array, said stator and said rotor having adjacent surfaces, said exit faces of said elements in each of said bundles being aligned in a separate column in said surface of said stator, said columns of exit faces being adjacent to each other and forming an array in said surface, at least one bundle of fiber optic elements having portions within said rotor, each of said elements of said one bundle having an entrance face and an exit face, said entrance faces of said elements of said one bundle being aligned in a column in said surface of said rotor, and said exit faces of said elements of said one bundle being arranged to form a spot.

3. A positioning device for a system having means to produce relative motion between a stator and a rotor in accordance with light information transmitted to photo-responsive means through selected bundles of fiber optic elements in said stator and said rotor, said device comprising said stator and said rotor, a plurality of substantially similar bundles of fiber optic elements, each of said elements having an entrance face and an exit face, said entrance faces of said elements in each of said bundles being aligned to form a spot, means disposing said spots in a matrix array, said stator and said rotor having adjacent surfaces, said exit faces of said elements in each of said bundles being aligned in a separate column in said surface of said stator, said columns of exit faces being adjacent to each other and forming an array in said surface, at least one bundle of fiber optic elements having portions within said rotor, each of said elements of said one bundle having an entrance face and an exit face, said entrance faces of said elements of said bundle being aligned in a column in said surface of said rotor, and said exit faces of said elements of said one bundle being arranged to form a spot, said elements of said plurality of substantially similar bundles having a diameter that is different from the diameter of said elements of said one bundle.

4. A positioning device for a system having means to produce relative motion between a stator and a rotor in accordance with light information transmitted to photo-responsive means through selected bundles of fibre optic elements in said stator and said rotor, said device comprising said stator and said rotor adapted to move with respect to said stator, a first plurality of substantially similar bundles of fiber optic elements, each of said elements having an entrance face for receiving light and an exit face for displaying light received by said entrance face, said entrance faces of said elements in each of said bundles being aligned to form a separate spot for receiving light, means disposing said spots in a matrix array, said stator and said rotor having adjacent surfaces, said exit faces of said elements in each of said bundles being aligned in a separate column in said surface of said stator for displaying light received by respective entrance faces, said columns of exit faces being parallel to each other and forming a parallel column array in said surface of said stator, a second plurality of bundles of fiber optic elements, each of said elements of said second plurality of bundles having an entrance face and an exit face, said entrance faces of said elements of each bundle of said second plurality of bundles being aligned in a separate column in said surface of said rotor and adapted to receive light from said parallel column array in said surface of said stator, and said exit faces of said elements of each bundle of said second plurality of bundles being arranged to form a separate spot for displaying light received by respective entrance faces.

5. A positioning device for a system having means to produce relative motion between a stationary part and a movable part in accordance with light information transmitted to photo-responsive means through selected bundles of fiber optic elements, said device comprising said stationary part and said movable part adapted to move with respect to said stationary part, a first and a second plurality of substantially similar bundles of fiber optic elements, each of said elements having an entrance face for receiving light and an exit face for displaying light received by said entrance face, said entrance faces of said elements in each of said first plurality of bundles being aligned to form a separate spot for receiving light, means disposing said spots in a matrix array, said stationary part and said movable part having adjacent surfaces, said exit faces of said elements in each of said first plurality of bundles being aligned in a separate column in said surface of said stationary part for displaying light received by respective entrance faces, said columns of exit faces being parallel to each other and forming a parallel column array in said surface of said stationary part, said entrance faces of said elements of each bundle of said second plurality of bundles being aligned in a separate column in said surface of said movable part and adapted to receive light from said parallel column array, and said exit faces of said elements of each bundle of said second plurality of bundles being arranged to form a separate spot for displaying light received by respective entrance faces.

6. A sensor for a system having means to produce relative motion between two parts in accordance with light information transmitted to photo-responsive means through selected bundles of fiber optic elements, said sensor comprising a first part and a second part adapted to move with respect to said first part along a predetermined path, a first and a second plurality of substantially similar light conducting means having entrance faces for receiving light and exit faces for displaying light received by said entrance faces, said entrance faces of said first plurality of light conducting means being arranged in a matrix array, said first part and said second part having adjacent surfaces, said exit faces of said first plurality of light conducting means being arranged in columns in said surface of said first part for displaying light received by respective entrance faces, said columns of exit faces being adjacent to and parallel to each other and forming a parallel column array in said surface of said first part, said entrance faces of said second plurality of light conducting means being arranged in adjacent columns in said surface of said second part to receive light from said parallel column array in said surface of said first part, and said exit faces of said second plurality of light conducting means being arranged to display light received by respective entrance faces.

7. A sensor for a system having means to produce relative motion between two parts in accordance with light information transmitted to photo-responsive means through selected bundles of fiber optic elements, said sensor comprising a first part and a second part adapted to move with respect to said first part along a predetermined path, a first plurality of substantially similar light conducting means having entrance faces for receiving light and exit faces for displaying light received by said entrance faces, said entrance faces of said light conducting means being arranged in a matrix array, said first part and said second part having adjacent surfaces, said exit faces of said light conducting means being arranged in columns in said surface of said first part for displaying light received by respective entrance faces, said columns of exit faces being adjacent to and parallel to each other and forming a parallel column array in said surface of said first part, a second plurality of light conducting means, each of said second plurality of light conducting means having entrance faces and exit faces, said entrance faces of said second plurality of light conducting means being arranged in adjacent columns in said surface of said second part to receive light from said parallel column array, and said exit faces of said second plurality of light conducting means being arranged to display light received by respective entrance faces, the width of each of said columns in said surface of said first part being different from the width of each of said columns in said surface of said second part.

8. In a servo system for positioning a load in accordance with information on an apertured record, a sensor comprising a stationary part and a movable part adapted to move along a predetermined path, said stationary and movable parts having adjacent surfaces defining said path, a first and a second plurality of bundles of fiber optic elements, each of said elements having an entrance face to receive light and an exit face to display the light received, each of said elements in said first plurality of bundles having a substantially uniform cross-section of a predetermined diameter, each of said elements of said second plurality of bundles having a substantially uniform cross-section of a diameter that differs from said predetermined diameter, each of said entrance faces of said elements in each of said bundles of said first plurality of bundles being arranged to form a spot, said spots being arranged in a matrix array to co-operate with said apertured record, said exit faces of each of said bundles of said first plurality of bundles being aligned in a separate column in said adjacent surface of said stationary part, said columns being adjacent to and parallel to each other and forming a parallel column array substantially perpendicular to said path, each of said entrance faces of said elements in each of said bundles of said second plurality of bundles being aligned in a column in said surface of said movable part, said columns in said surface of said movable part being adjacent to and parallel to each other and substantially parallel to said columns in said parallel column array in said surface of said stationary part, said exit faces of said elements of each of said bundles of said second plurality of bundles being arranged in separate spots, a plurality of photosensitive devices associated with each of said last-named spots to receive light signals therefrom, respectively, and means coupling said load to said movable part.

9. A sensor adapted to transmit light in accordance with information on an apertured record and to position a load in accordance with said information, said sensor comprising a stationary part and a movable part co-operatively associated with said stationary part, first optical means comprising a bundle of fiber optic elements having entrance faces and exit faces, said entrance faces being arranged in a matrix responsive to said information, said exit faces being arranged in a first array of parallel columns on said stationary part to display said light on certain selected adjacent ones of said columns adjacent to the remaining adjacent ones of said columns with a light-to-dark transition therebetween in response to said information on said apertured record, the position of said light-to-dark transition being determined by said information, second optical means comprising a further bundle of fiber optic elements having entrance faces and exit faces, said entrance faces of said further bundle of fiber optic elements being arranged in a second array of parallel columns on said movable part, said exit faces of said further bundle of fiber optic elements being arranged in spots, each of said spots being adapted to receive light from a separate column of said second array, respectively, a separate photosensitive device disposed to receive light from each of said spots, respectively, a plurality of photo-sensors positioned to be selectively illuminated by light passing through said apertured record, means responsive to the illumination of one of said photosensors to select the output of one of said photo-sensitive devices, means responsive to said selected output to cause motion of said movable part, and means coupling said load to said movable part for movement therewith.

References Cited by the Examiner
UNITED STATES PATENTS

| | | | |
|---|---|---|---|
| 2,254,932 | 9/41 | Bryce | 250—227 X |
| 2,397,202 | 3/46 | Potts | 250—227 X |
| 2,625,300 | 1/53 | Saxe | 250—227 X |
| 2,967,664 | 1/61 | Rees | 250—227 X |

RALPH G. NILSON, *Primary Examiner.*
WALTER STOLWEIN, *Examiner.*